Patented Oct. 20, 1942

2,299,141

UNITED STATES PATENT OFFICE 2,299,141

NITROGENOUS ANTHRAQUINONE DERIVATIVE

Hermann Hauser, Binningen, and Max Bommer, Riehen, Switzerland, assignors to the firm Society of Chemical Industry in Basle, Basel, Switzerland No Drawing. Application July 26, 1938, Serial No. 221,440. In Switzerland July 29, 1937

3 Claims. (Cl. 260—377)

This invention relates to the manufacture of nitrogenous anthraquinone derivatives by causing 1-halogen-3-acylanthraquinones of the general formula

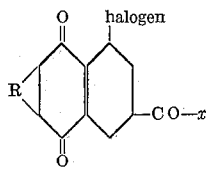

wherein R stands for a phenylene radical and $x$ stands for a hydrocarbon radical, to react with such compound of nitrogen which have at least two hydrogen atoms attached to a nitrogen atom.

The 1-halogen-3-acylanthraquinones of the above formula serving as parent materials, wherein the phenylene radical may contain substituents, such as for example alkyl-groups or halogens, are new products which may be obtained for example by the reaction of halides of the 1-halogen-3-antraquinone carboxylic acids with compounds containing ketone groups capable of being enolized, or with aromatic hydrocarbons or derivatives thereof which are amenable to the Friedl-Craft reaction. Such hydrocarbons are for example benzene, toluene, naphthalene, anthracene and further substitution products of these compounds.

Compounds of nitrogen which contain at least two hydrogen atoms attached to a nitrogen atom and are used in the invention for reaction with 1-halogen-3-acylanthraquinones are, for example, ammonia, aliphatic, aromatic, aliphatic-aromatic, hydro-aromatic primary amines as well as sulfamides which may belong for example to the benzene or naphthalene series. If the amines used contain two amino-groups, 1 mol of the amine may be caused to react with 2 mols of 1 - halogen - 3 - acylanthraquinones. Suitable amines and amides are for example methylamine, ethylamine, aniline, benzylamine, ortho-, para- or meta-toluidine, phenylenediamines, α- and β-naphthylamines, aminotetraline, benzene sulfamide, toluene sulfamide, and amides of naphthalene sulfonic acids. Suitable amines are further such amines which contain groups capable of being vatted; this is for example the case with aminoanthraquinones, for example 1- or 2-aminoanthraquinones or 1-benzoylamino-4- or -5-aminoanthraquinones. The products obtained with aid of primary amides, such as for example sulfamides of the benzene series, may be treated with saponifying agents, for instance sulfuric acid, whereby 1-amino-3-acylanthraquinones are obtained.

A development of the process consists in causing compounds which may be obtained containing a primary amino-group to react with compounds which contain at least one reactive halogen atom. Such halogen compounds are for example mono- and di-carboxylic acid halides, for instance the halides of benzoic acid, isophthalic acid, terephthalic acid, acetic acid, naphthalene carboxylic acids, anthracene- and anthraquinone-carboxylic acids. All these carboxylic acids may still contain further substituents in addition to the acid halide group, for example alkyl-groups, alkoxy-groups, nitro-groups or halogens. When using dicarboxylic acid dihalides 2 mols of a compound containing a primary amino-group may be caused to react with 1 mol of a dicarboxylic acid dihalide.

The two aforesaid reactions are preferably carried out in solvents of high boiling point, for instance dichlorobenzene, trichlorobenzene, nitrobenzene and in presence of agents that bind hydrogen halide, for instance calcium carbonate, sodium carbonate or alkali acetate and copper or copper compounds.

A further development of the process consists in treating the products obtained with condensing agents. Suitable condensing agents are, for example, concentrated sulfuric acid, chlorosulfonic acid, aluminium chloride (alone or in conjunction with chlorides of the alkali metals or pyridine) or caustic alkalies (alone or in conjunction with alcohols).

The anthraquinone derivatives obtainable according to the present process have the following general formula:

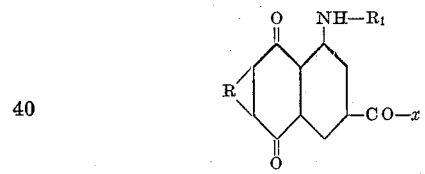

wherein R stands for a phenylene radical, $x$ stands for a hydrocarbon radical and $R_1$ stands for hydrogen, aryl or acyl.

The products obtained by the invention are dyestuffs or intermediate products for the manufacture of dyestuffs. Those that are vat dyestuffs are of especial value; they dye vegetable fibers, for instance, cotton, very fast tints, particularly to light. The entrance of the acyl radical into the 3-position of the anthraquinone radical brings about in surprising manner an increase of the affinity for the fiber.

The following examples illustrate the invention, the parts being by weight, and the ratio of the parts by volume to parts by weight being that which exists between the litre and the kilo:

*Example 1*

43 parts of 1-bromo-3-acetylanthraquinone (obtainable by the reaction of 1-bromo-3-anthraquinone carboxylic acid chloride with magnesium malonic acid ethyl ester), 34 parts of para-toluene-sulfamide, 20 parts of anhydrous sodium acetate, 1 part of copper acetate, 300 parts by volume of amyl alcohol are mixed together and the mixture is heated for 12 hours to boiling under reflux; the product of the formula

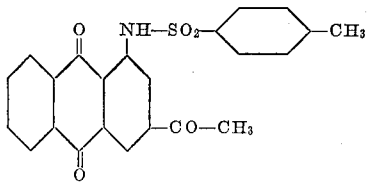

is filtered cold, the solid matter is washed with alcohol and water and dried. By saponification with concentrated sulfuric acid at the ordinary temperature, there is obtained from the product 1-amino-3-acetylanthraquinone of the formula

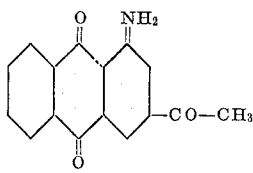

which crystallises from chlorobenzene in red needles and melts at 214–215° C.

*Example 2*

20 parts of 1-bromo-3-benzoylanthraquinone (obtainable by condensing 1-bromo-3-anthraquinone carboxylic acid chloride with benzene in presence of aluminium chloride), 12 parts of 1-amino-anthraquinone, 15 parts of calcined sodium carbonate, 0.5 part of copper acetate and 300 parts of nitrobenzene are mixed together and the mixture is heated for 12 hours to boiling. The product of the formula

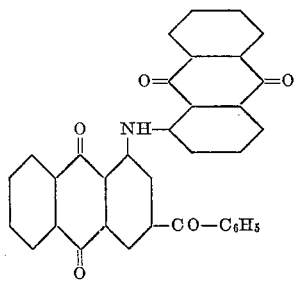

is filtered cold, the solid matter is washed with nitrobenzene, alcohol and water and dried. It dissolves in concentrated sulfuric acid to a grass green solution, which on addition of water yields red flocks.

*Example 3*

16.4 parts of 1-amino-3-benzoylanthraquinone of the formula

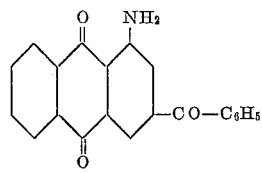

(obtainable from 1-bromo-3-benzoylanthraquinone by reaction with para-toluenesulfamide and saponification with concentrated sulfuric acid at ordinary temperature) and 6 parts of terephthalic acid chloride are added to 300 parts of ortho-dichlorobenzene and the whole is heated to boiling for 1 hour. The product is filtered cold and the solid matter washed with chlorobenzene. This new dyestuff of the formula

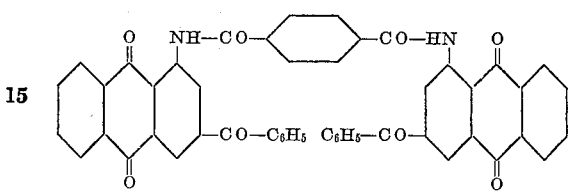

is in the form of yellow needles which dissolve in concentrated sulfuric acid to a yellow solution; when added to water the solution yield greenish yellow flocks.

In a cold or hot violet-black vat the dyestuff dyes cotton pure greenish yellow tints having very good properties of fastness.

When the dyestuff is treated with hot dilute sodium hypochlorite solution it is obtained in a still purer form.

If instead of terephthalic acid chloride the isophthalic acid chloride is used, a dyestuff of the formula

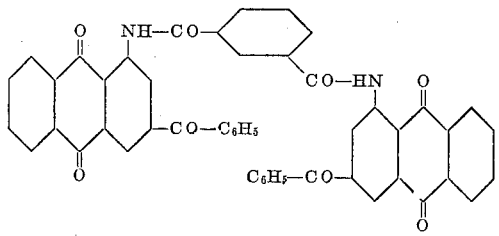

of similar properties is obtained.

If in analogous manner 1 mol of 1-amino-3-benzoylanthraquinone is treated with 1 mol of benzoyl-chloride, there is obtained a new dyestuff of the formula

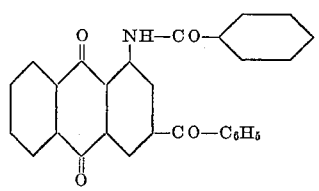

which dyes cotton strong greenish yellow tints. This dyestuff also has very good properties of fastness.

*Example 4*

12 parts of the anthramide described in Example 2 are mixed with 60 parts of pyridine and 30 parts of aluminium chloride, and the whole is heated for one hour at 150–160° C. The mass at about 100° C. is then transferred into an alkaline hydrosulfite solution and the dyestuff, after filtration of particles incapable of being vatted, is precipitated by blowing in air. It is then isolated by filtration and in moist condition mixed with aqueous sodium hypochlorite solution with which it is heated to boiling under reflux for 12 hours. When dry this new dyestuff of the formula

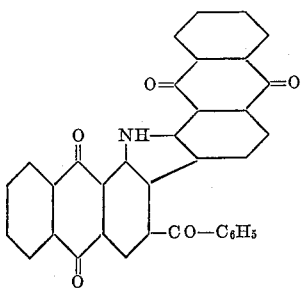

is a reddish yellow powder. It dissolves in concentrated sulfuric acid to a brown-red solution. It dyes cotton in a yellow-brown vat very fast strong yellow tints particularly fast to light.

*Example 5*

16.4 parts of 1-amino-3-benzoylanthraquinone, 15.5 parts of Bz-1-bromobenzanthrone, 10 parts of calcined sodium carbonate, 1 part of copper acetate and 300 parts of nitrobenzene are mixed together and the mixture is heated to boiling for 12 hours. The product is filtered cold, washed with nitrobenzene, alcohol and water and dried. It crystallised in brownish needles and dissolves in concentrated sulfuric acid to a dull green solution.

10 parts of the product thus obtained are now melted with 100 parts of caustic potash and 50 parts of alcohol at 150-160° C. for 2 hours. By transferring the mass to water and blowing in air, the new dyestuff is precipitated and may be isolated by filtration.

It dissolves in concentrated sulfuric acid to an olive green solution and dyes cotton in a brown-violet vat strong and fast olive green.

*Example 6*

10.9 parts of 1-amino-3-benzoylanthraquinone, 2.1 parts of cyanuric chloride and 100 parts of phenol are heated together slowly to 160-170° C. and kept at this temperature for 3 hours. There is produced a yellow solution of a new dyestuff which is cooled to 130° C. and then mixed at this temperature with 100 parts of pyridine. On cooling there separates a dyestuff of the formula

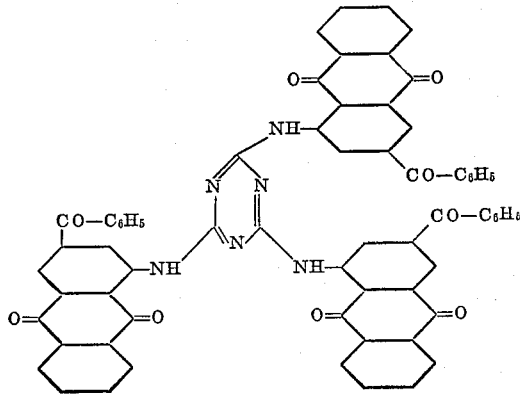

in crystalline form which is isolated by filtration. When dry it is a yellow-brown powder soluble in concentrated sulfuric acid to a yellow solution. It dyes cotton in a violet-black vat very strong reddish yellow.

What we claim is:

1. Nitrogenous anthraquinone derivatives of the general formula

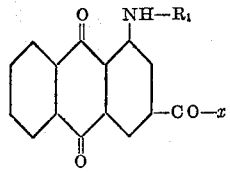

wherein $x$ stands for an aromatic hydrocarbon substituent and $R_1$ is an aromatic acyl radical free from hetero atoms and cyclically bound carbonyl groups, said derivatives dyeing vegetable fibers fast yellowish tints.

2. Nitrogenous anthraquinone derivatives of the general formula

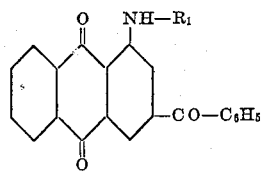

wherein $R_1$ is an aromatic acyl radical free from hetero atoms and cyclically bound carbonyl groups, said derivatives dyeing vegetable fibers fast yellowish tints.

3. Nitrogenous anthraquinone derivatives of the general formula

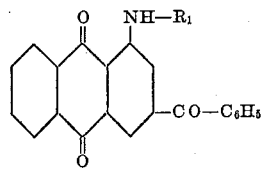

wherein $R_1$ is a benzoyl radical.

HERMANN HAUSER.
MAX BOMMER.